(12) United States Patent
Chen et al.

(10) Patent No.: US 8,325,206 B2
(45) Date of Patent: Dec. 4, 2012

(54) IMAGE PROCESSING METHOD

(75) Inventors: I-Fei Chen, Taoyuan County (TW);
Wen-Shu Chien, Taoyuan County (TW);
I-Fang Li, Taoyuan County (TW);
Wei-Ting Hsieh, Taoyuan County (TW)

(73) Assignee: HTC Corporation, Taoyuan County (TW)

( * ) Notice: Subject to any disclaimer, the term of this patent is extended or adjusted under 35 U.S.C. 154(b) by 763 days.

(21) Appl. No.: 12/188,220

(22) Filed: Aug. 8, 2008

(65) Prior Publication Data
US 2009/0085933 A1 Apr. 2, 2009

(30) Foreign Application Priority Data
Sep. 30, 2007 (CN) .......................... 2007 1 0162262

(51) Int. Cl.
*G09G 5/00* (2006.01)
*G06F 3/041* (2006.01)
(52) U.S. Cl. .................. 345/650; 345/173; 345/649
(58) Field of Classification Search .................. 345/649, 345/650, 173; 715/863
See application file for complete search history.

(56) References Cited

U.S. PATENT DOCUMENTS

| | | | | |
|---|---|---|---|---|
| 5,347,295 A * | 9/1994 | Agulnick et al. | ............. | 345/156 |
| 5,483,261 A * | 1/1996 | Yasutake | ...................... | 345/173 |
| 5,500,935 A * | 3/1996 | Moran et al. | .................... | 715/863 |
| 5,502,803 A * | 3/1996 | Yoshida et al. | ............... | 715/201 |
| 5,523,775 A * | 6/1996 | Capps | .......................... | 345/179 |
| 5,583,542 A * | 12/1996 | Capps et al. | ..................... | 345/173 |
| 5,612,719 A * | 3/1997 | Beernink et al. | ................ | 345/173 |
| 5,617,114 A * | 4/1997 | Bier et al. | ....................... | 345/634 |
| 5,796,406 A * | 8/1998 | Shigematsu et al. | .......... | 715/863 |
| 5,798,752 A * | 8/1998 | Buxton et al. | ................. | 715/863 |
| 5,844,547 A * | 12/1998 | Minakuchi et al. | ............ | 345/173 |
| 5,861,886 A * | 1/1999 | Moran et al. | .................... | 715/863 |
| 5,880,743 A * | 3/1999 | Moran et al. | ................... | 345/473 |
| 5,999,648 A * | 12/1999 | Yamaguchi | .................... | 382/189 |
| 6,320,601 B1* | 11/2001 | Takasu et al. | ................. | 715/764 |
| 6,560,361 B1* | 5/2003 | Collins | .......................... | 382/203 |
| 6,958,749 B1* | 10/2005 | Matsushita et al. | ............ | 345/175 |
| 7,004,394 B2* | 2/2006 | Kim | .......................... | 235/472.01 |
| 7,536,656 B2* | 5/2009 | Hullender et al. | ............. | 715/863 |
| 7,697,016 B2* | 4/2010 | Sakakura | ....................... | 345/649 |
| 2003/0184525 A1* | 10/2003 | Tsai | ............................. | 345/173 |
| 2005/0114788 A1 | 5/2005 | Fabritius | | |
| 2008/0036771 A1* | 2/2008 | Bae | ................................ | 345/442 |
| 2008/0084430 A1* | 4/2008 | Sakakura | ....................... | 345/649 |
| 2008/0168402 A1* | 7/2008 | Blumenberg | ................. | 715/863 |

OTHER PUBLICATIONS

"Office Action of Taiwan Counterpart Application", issued on May 30, 2011, p. 1-p. 6.

* cited by examiner

*Primary Examiner* — M Good Johnson
(74) *Attorney, Agent, or Firm* — Jianq Chyun IP Office

(57) ABSTRACT

An image processing method is provided. The image processing method is used for using a stream of drawing as an input on an image displayed on a display. The image processing method includes steps of identifying the input as a non-closed region input and performing an image rotation operation.

22 Claims, 7 Drawing Sheets

IMAGE PROCESSING METHOD

CROSS-REFERENCE TO RELATED APPLICATION

This application claims the priority benefit of Chinese application serial no. 200710162262.8, filed Sep. 30, 2007. The entirety of the above-mentioned patent application is hereby incorporated by reference herein and made a part of this specification.

BACKGROUND OF THE INVENTION

1. Field of the Invention

The present invention relates to a data processing method, and more particularly, to an image rotation operation.

2. Description of Related Art

Since the coming of digital era, the early camera used to record static frames on a soft negative film makes it impossible to immediately review the shot images, and it takes additional time and money to develop the film into photos. Thus, the conventional camera is gradually replaced by digital cameras which can immediately review the captured images, and can even be linked to a developing machine to have the images directly transferred thereto and be developed.

Besides immediately reviewing the images on the camera, the advantage of image digitalization also lies in sharing the digital images through network or wireless transmission rapidly, or browsing the images on other devices equipped with a display. Currently, portable devices equipped with a display for viewing an image are varied, such as cell-phones or personal digital processors. However, in order to view an image or even perform an image processing operation, for example, zooming in, out, or moving an image, on a cell-phone or a personal digital processor, the user has to press several keys or buttons to select the image region or the image region for performing the image operation. The above operating method is not only complicated but slow in action. Besides, the functions of the keys cannot be simplified in design, and further the keys cannot be reduced to diminish the size of the device.

SUMMARY OF THE INVENTION

Accordingly, the present invention is directed to provide an image processing method, which is useful for directly using a stream of drawing as a single input on a display, so as to rotate an image.

The present invention is further directed to provide an image processing method, which merely needs one input step to perform a rotation operation of the image displayed on the display.

The present invention provides an image processing method, which is useful for using a stream of drawing as an input on an image displayed on a display. The image processing method includes: identifying the input as a non-closed region input and performing an image rotation operation.

In the image processing method according to an embodiment of the present invention, the stream of drawing includes an initial point, an end point, and a plurality of drawing connection points between the initial point and the end point. Furthermore, the step of identifying the input as the non-closed region input includes: identifying a minimum external border of the stream of drawing, according to relative coordinates of the initial point, the end point, and the drawing connection points of the stream of drawing on the display; next, equally dividing an image region enclosed by the minimum external border into several sub-regions; and then, identifying a first sub-region and a second sub-region where the initial point and the end point are located respectively, and a plurality of third sub-regions where a portion of the drawing connection points close to the end point are located; thereafter, when the second sub-region and third sub-regions are not adjacent to the first sub-region respectively, identifying the input as the non-closed region input. Further, the minimum external border is of a rectangular shape. Additionally, the sub-regions further include at least one center sub-region located at a geometric center of the image region. Furthermore, the image rotation operation includes rotating the image around the geometric center of the image region. Further, the step of identifying the input as the non-closed region input further includes: when the sub-regions where the drawing connection points are distributed do not include the center sub-regions, identifying the input as the non-closed region input. Additionally, before performing the image rotation operation, the image processing method further includes identifying a drawing forming direction of the stream of drawing from the initial point through the drawing connection points to the end point. The step of performing the image rotation operation includes rotating the image by taking the drawing forming direction as a rotation direction. The rotation direction includes a clockwise direction.

In the image processing method according to an embodiment of the present invention, the stream of drawing includes a gesture figure directly formed on the display.

In the image processing method according to an embodiment of the present invention, the input includes a drawing initiation action, a drawing connection action, and a drawing ending action, and the drawing ending action triggers the image rotation operation.

In the image processing method according to an embodiment of the present invention, the image rotation operation includes rotating the image by a predetermined angle, and the predetermined angle for rotating the image is about 90 degrees.

In the image processing method according to an embodiment of the present invention, the image rotation operation includes rotating the image around the geometric center of the image.

The present invention further provides an image processing method, which is useful for using a stream of drawing as an input on an image displayed on a display, in which the input at least includes a drawing ending action. The image processing method includes: identifying a drawing forming direction of the stream of drawing, triggering an image rotation operation by the drawing ending action, and rotating the image by taking the drawing forming direction as a rotation direction.

In the image processing method according to an embodiment of the present invention, an angle for rotating the image is about 90 degrees.

In the image processing method according to an embodiment of the present invention, before the step of identifying the drawing forming direction, the image processing method further includes: identifying a minimum external border of the stream of drawing, according to relative coordinates of a initial point, an end point, and a plurality of drawing connection points between the initial point and the end point of the stream of drawing on the display; next, equally dividing an image region enclosed by the minimum external border into several sub-regions; and then, identifying a first sub-region and a second sub-region where the initial point and the end point are located respectively, and a plurality of third sub-regions where a portion of the drawing connection points close to the end point are located; thereafter, when the second sub-region and third sub-regions are not adjacent to the first sub-region respectively, identifying the input as the non-closed region input. The minimum external border is of a rectangular shape. Additionally, the sub-regions further include at least one center sub-region at a geometric center of the image region. Furthermore, the step of identifying the input as the non-closed region input further includes: when the sub-regions regions where the drawing connection points are distributed do not include the center sub-regions, identifying the input as the non-closed region input. Further, the image rotation operation includes rotating the image around the geometric center of the image region.

In the image processing method according to an embodiment of the present invention, the image rotation operation includes rotating the image around the geometric center of the image.

In the image processing method according to an embodiment of the present invention, the stream of drawing includes a gesture figure directly formed on the display.

In the image processing method according to an embodiment of the present invention, the image rotation operation includes rotating the image by a predetermined angle, and the predetermined angle for rotating the image is about 90 degrees.

In the image processing method according to an embodiment of the present invention, the rotation direction includes a clockwise direction.

In the present invention, a stream of drawing is directly formed on a display as an input, and an image rotation process is performed on an image displayed on the display when the stream of drawing is input, according to the information of the input stream of drawing including whether the stream of drawing accords with the non-closed region input and the drawing forming direction of the stream of drawing. Therefore, the user does not have to carry out any additional input step to perform a rotation operation of the image on the display after inputting the stream of drawing on the display.

In order to make the aforementioned and other objects, features and advantages of the present invention comprehensible, preferred embodiments accompanied with figures are described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 3A' is a partial enlarged schematic view of FIG. 3A.

FIG. 3B' is a partial enlarged schematic diagram of FIG. 3B.

DESCRIPTION OF EMBODIMENTS

Figure 1:
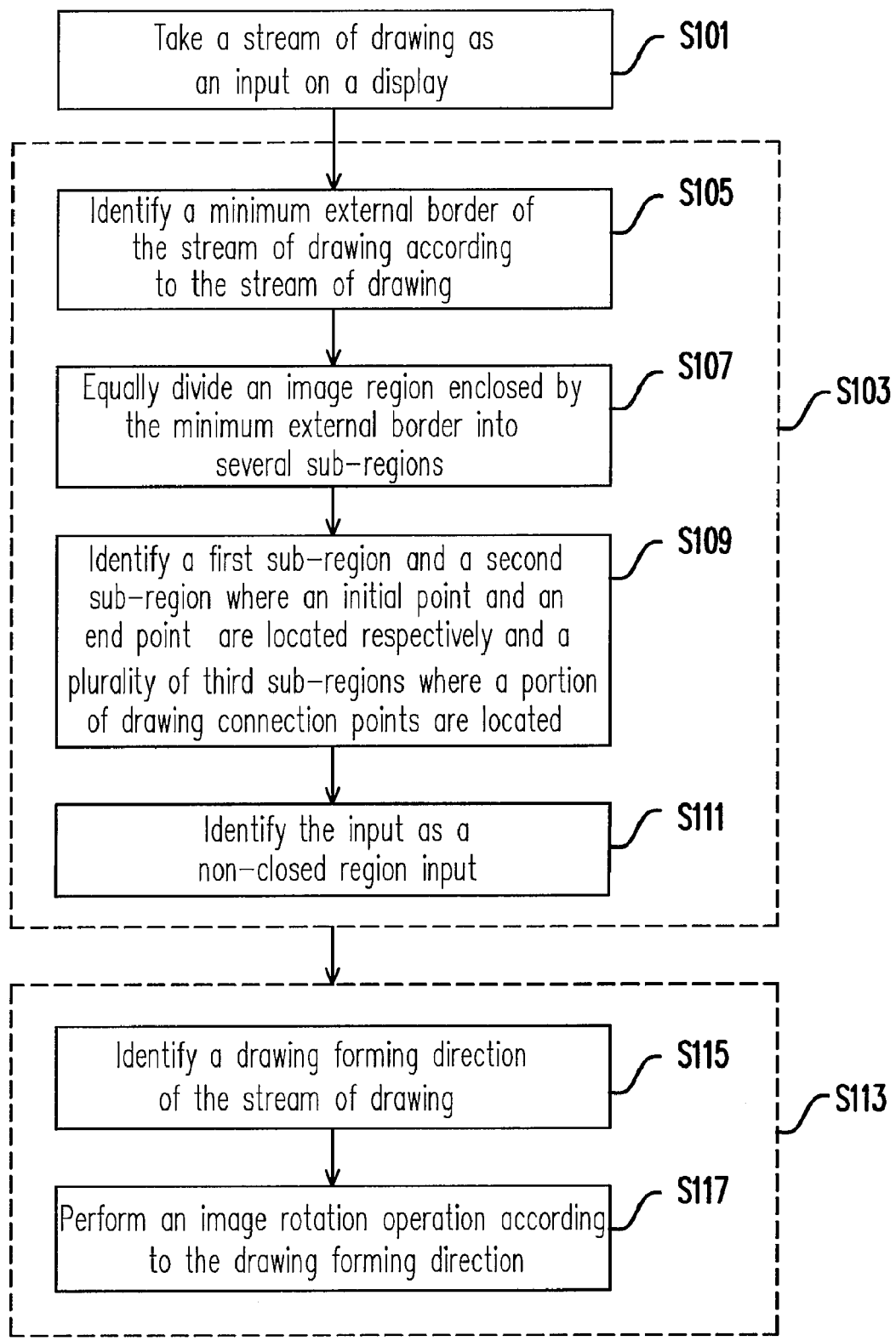
FIG. 1 is a schematic flow chart of an image processing method according to an embodiment of the present invention.
Figure 2A:
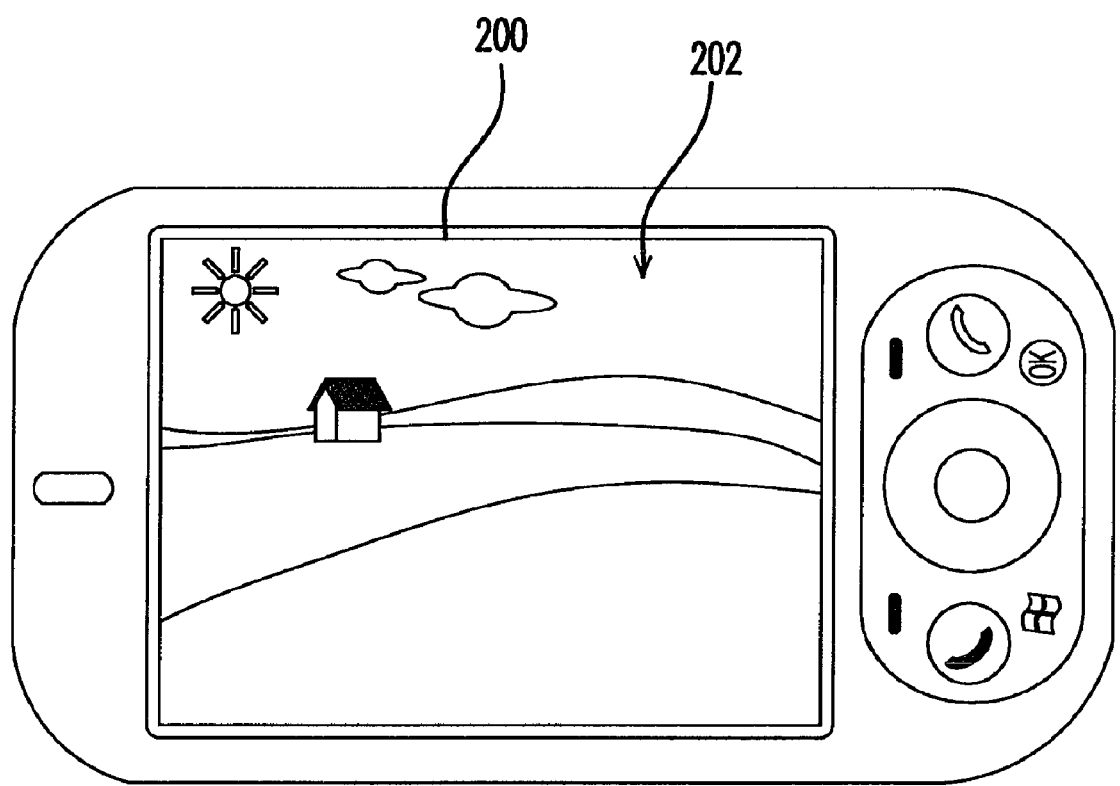
FIGS. 2A to 2C are schematic views showing practical operations of an image rotation process method according to an embodiment of the present invention.
Figure 2B:
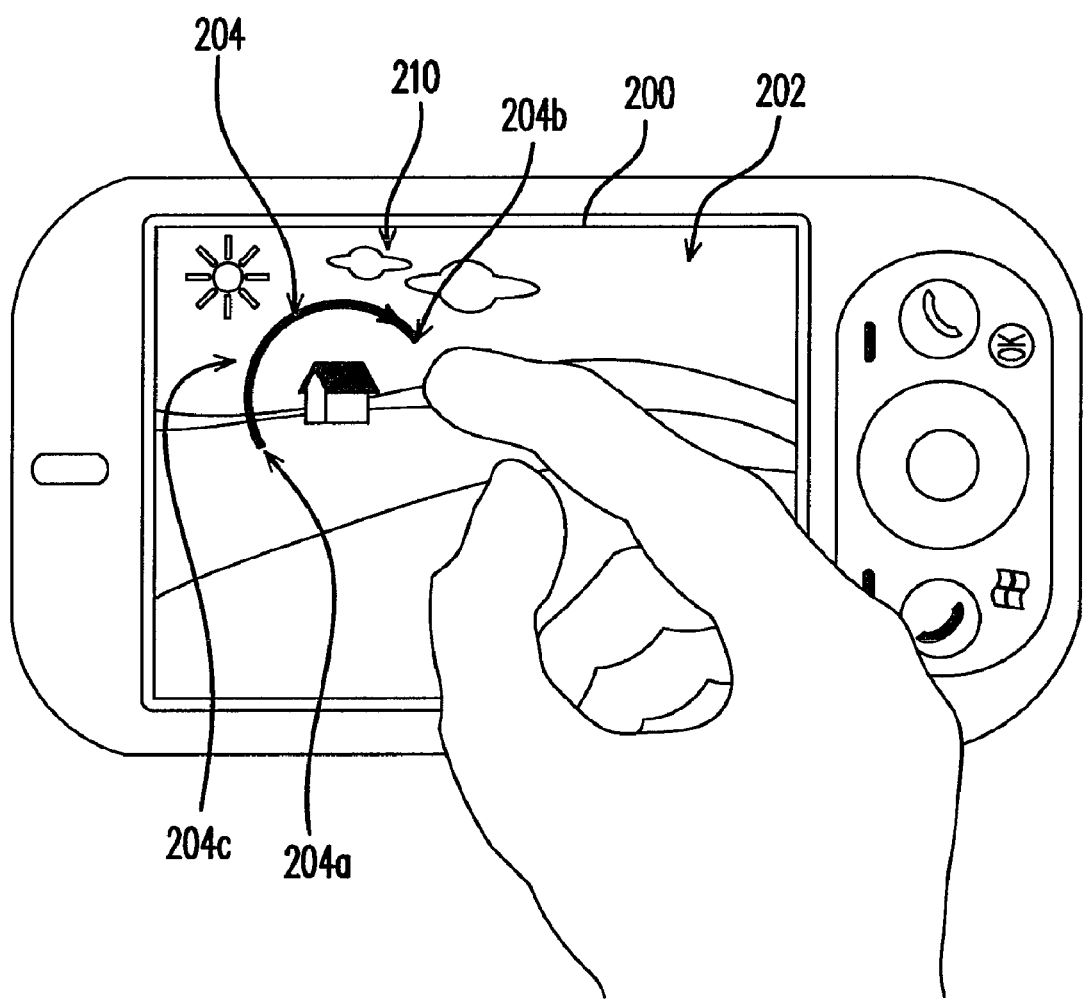
Figure 2C:
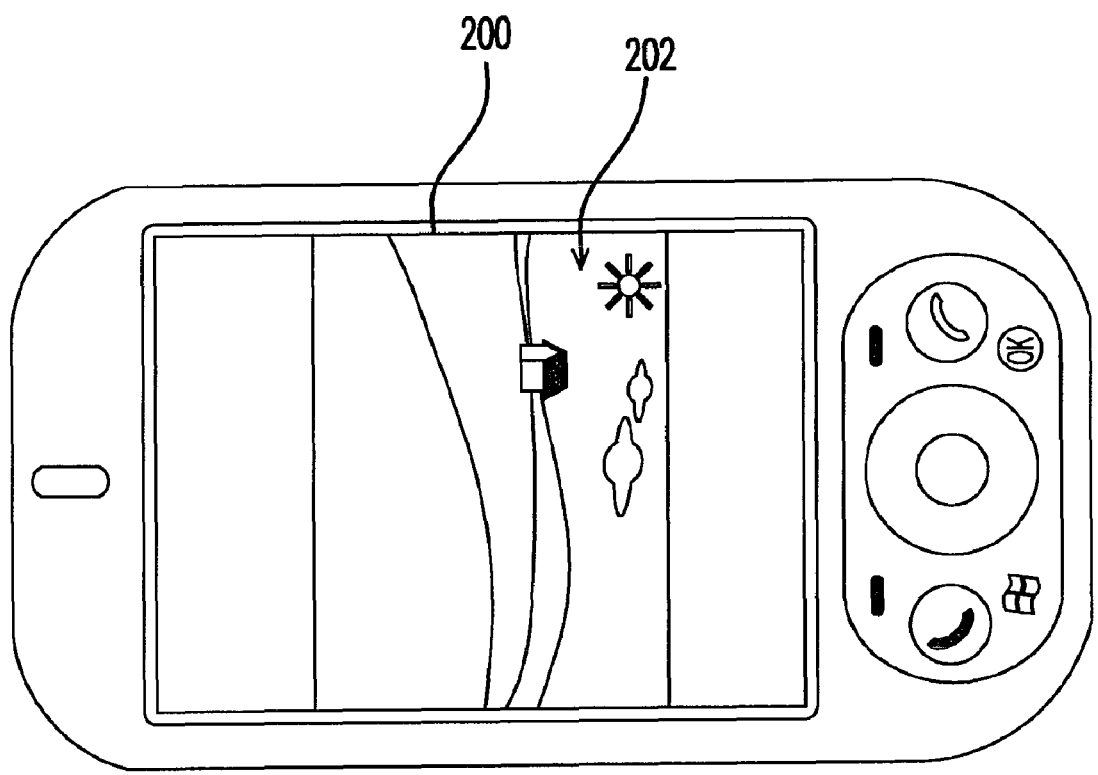

FIG. 1 is a schematic flow chart of an image processing method according to an embodiment of the present invention. FIGS. 2A to 2C are schematic views showing practical operations of an image rotation process method according to an embodiment of the present invention. Referring to FIGS. 1, 2A, and 2B, first, a stream of drawing 204 is directly input on a display 200 displaying an image 202 (Step S101). The display 200 is, for example, a touch screen, and the method for directly inputting the stream of drawing 204 on the display 200 includes forming a gesture figure on the display 200 by finger, touch pen, or any other device capable of performing an input action on the touch screen.

The stream of drawing 204 includes an initial point 204a, an end point 204b, and a plurality of drawing connection points 204c between the initial point 204a and the end point 204b. Furthermore, as for signal inputting, when taking the stream of drawing 204 as an input, the input includes a drawing initiation action (i.e. the step of forming the initial point 204a of the stream of drawing 204), a drawing connection action (i.e. the step of forming the drawing connection points 204c of the stream of drawing 204), and a drawing ending action (i.e. the step of forming the end point 204b of the stream of drawing 204).

Figure 3A:
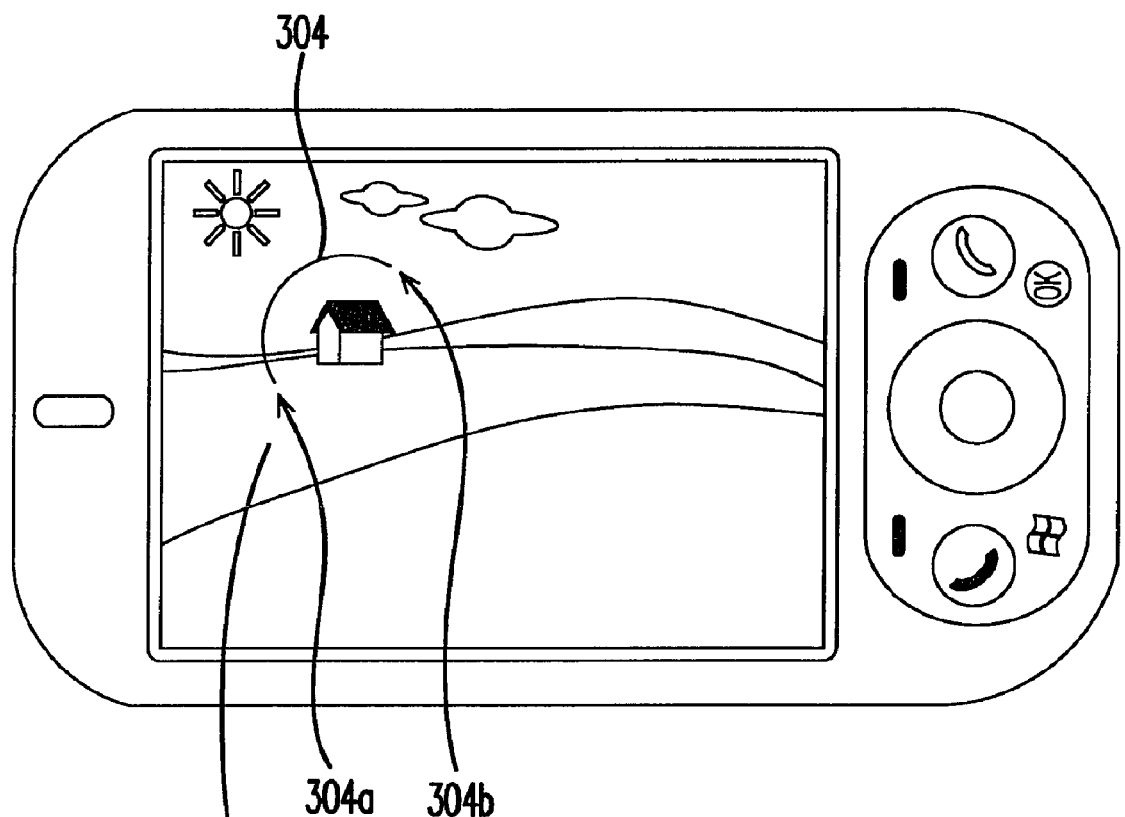
FIG. 3A is a schematic view illustrating the step of identifying the input as a non-closed region input according to an embodiment of the present invention.
Figure 3A:
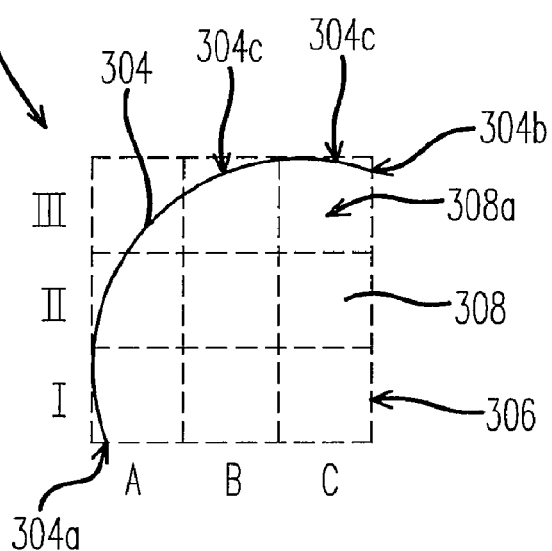
Figure 3B:
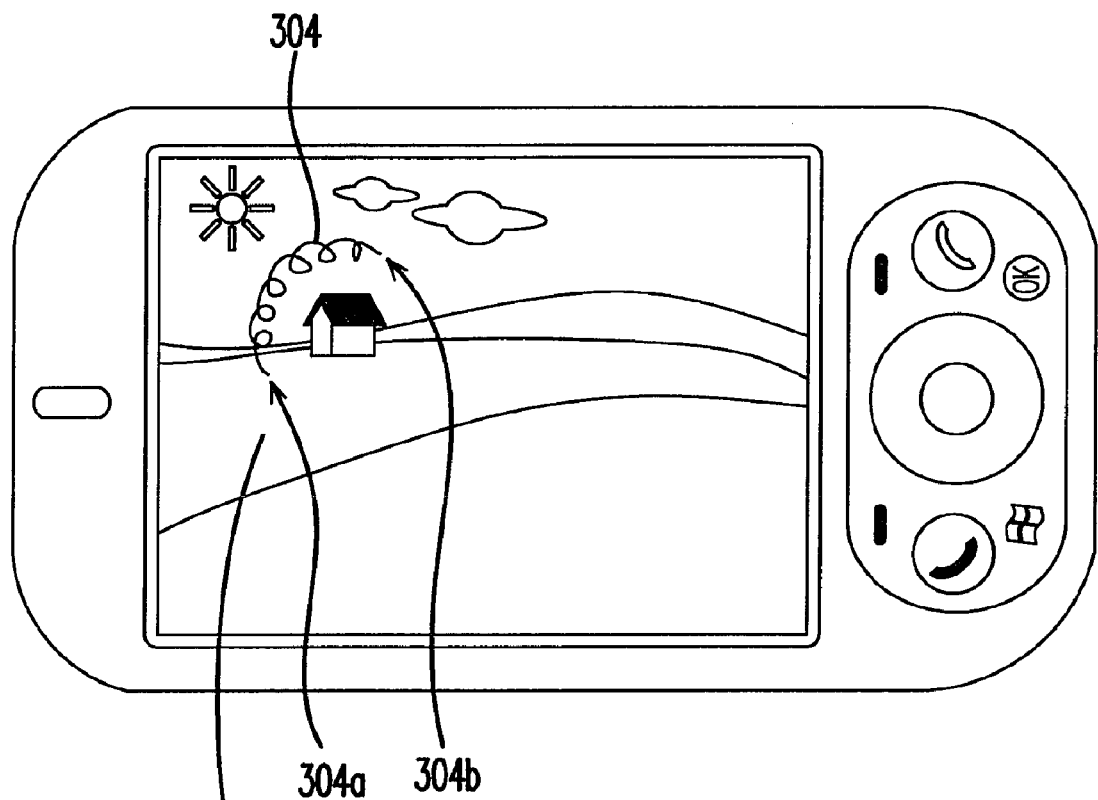
FIG. 3B is a schematic view illustrating the step of identifying the input as a closed region input according to an embodiment of the present invention.
Figure 3B:
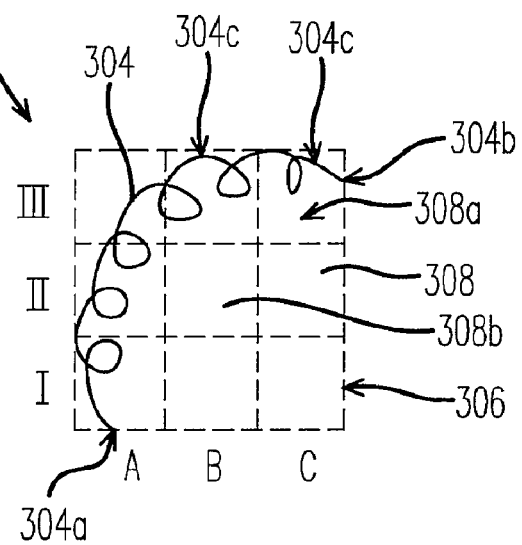

Next, referring to FIG. 1, in Step S103, an input of the stream of drawing 204 is identified as a non-closed region input. That is to say, the stream of drawing 204 does not surround the image 202 displayed on the display 200, but form an arc gesture figure on the display 200, and the input of the stream of drawing is identified as a non-closed region input. The arc gesture figure is, for example, a semicircular arc. During the step of identifying the input as a non-closed region input, first, a minimum external border of the stream of drawing 204 is identified according to relative coordinates of the initial point 204a, the end point 204b, and the drawing connection points 204c of the stream of drawing 204 on the display 200 (Step S105). As shown in FIGS. 3A to 3B and 3A' and 3B', when directly input the stream of drawing 204 on the display 200, the initial point 204a, the end point 204b, and all of the drawing connection points 204c of the stream of drawing on the display 200 are respectively allocated with a coordinate on the display 200. A minimum border 306 (as shown in FIG. 3A') is defined according to all of the coordinates on the stream of drawing 204. The minimum external border encloses a minimum image region 308 including the stream of drawing 204/304. The minimum external border 306 is, for example, of a rectangular shape.

Thereafter, in Step S107, the image region 308 enclosed by the minimum external border 306 is equally divided into several sub-regions 308a. The sub-regions 308a further include at least one center sub-region 308b at a geometric center of the image region 308. In the embodiments of FIGS. 3A' and 3B', the image region enclosed by the minimum external border is equally divided into, for example, but not limited to, 3×3 parts. That is to say, the inventor can equally divide the image region enclosed by the minimum external border at will.

Then, in Step S109, a first sub-region and a second sub-region where the initial point 204a and the end point 204b are located respectively and a plurality of third sub-regions where a portion of the drawing connection points 204c close to the end point 204b are located are identified. Next, in Step S111, the input of the stream of drawing 204 is identified as the non-closed region input. Referring to FIGS. 3A and 3A', the initial point 304a of stream of drawing 304 is in the first sub-region IA, the end point 304b is in the second sub-region IIIC, the drawing connection points 304c close to the end point 304b are respectively in the third sub-regions IIIB and second sub-region IIIC, and if the first sub-region IA are not adjacent to the second sub-region IIIC and the third sub-regions IIIC, the input of the stream of drawing is identified as the non-closed region input.

Furthermore, in an embodiment, referring to FIGS. 3B and 3B', the conditions for identifying the input of the stream of drawing as the non-closed region input further include when the sub-regions 308a where the drawing connection points are distributed does not include the center sub-region 308b, identifying the input as the non-closed region input.

Figure 4:
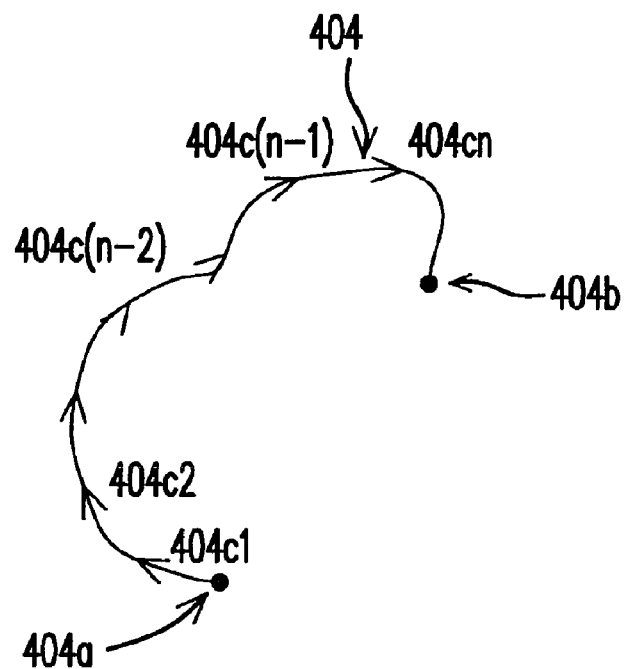
FIG. 4 is a schematic view of a drawing forming direction of the stream of drawing according to an embodiment of the present invention.
Figure 5:
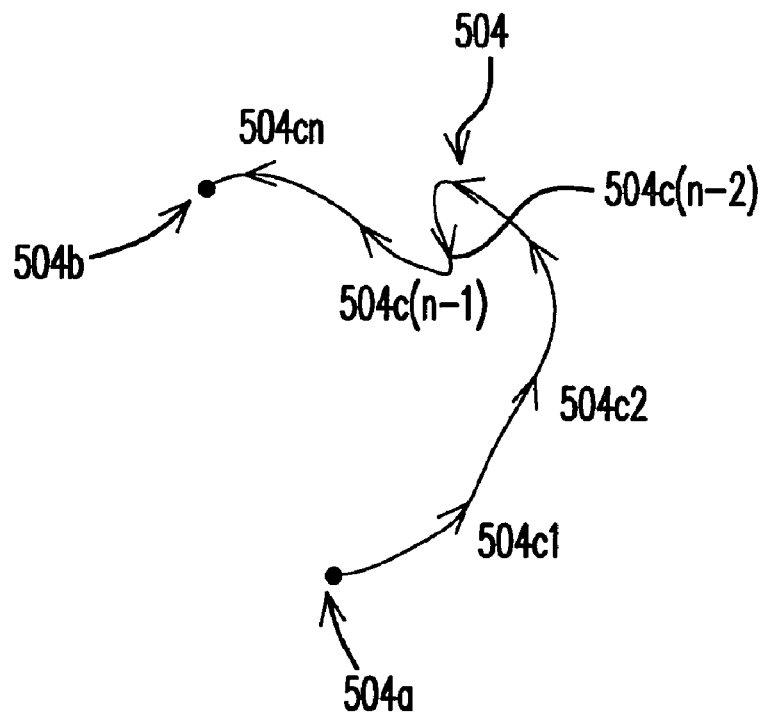
FIG. 5 is a schematic view of a drawing forming direction of the stream of drawing according to another embodiment of the present invention.

Referring to FIGS. 1 and 2B again, after Step S103, Step S113 is carried out to perform an image rotation operation on the image 202 on the display 200. In the Step S113, performing an image rotation operation further includes: in Step S115, identifying a drawing forming direction 210 of the stream of drawing 204 from the initial point 204a through the drawing connection points 204c to the end point 204b, i.e., the net direction of forming the stream of drawing. FIG. 4 is a schematic view of a drawing forming direction of the stream of drawing according to an embodiment of the present invention. FIG. 5 is a schematic view of a drawing forming direction of the stream of drawing according to another embodiment of the present invention. Referring to FIG. 4, in an embodiment, a stream of drawing 404 is composed of an initial point 404a, an end point 404b and n drawing connection points 404c. According to the sequence that the stream of drawing 404 is formed from the initial point 404a through the n drawing connection points 404c, i.e., the drawing connection points 404c1, 404c . . . 404c(n-2), 404c(n-1), 404cn, to the end point 404b, the drawing forming direction of every adjacent two points on the stream of drawing 404 is integrated into the forming directions of the stream of drawing 404, in which the drawing forming direction is a clockwise direction. Referring to FIG. 5, in this embodiment, although a stream of drawing 504 is not a smooth gesture track, the method of identifying the drawing forming direction of the stream of drawing 404 according to FIG. 4 can still be applied on the stream of drawing 504 in FIG. 5, so as to obtain the drawing forming direction of the stream of drawing 504, in which the drawing forming direction is an anticlockwise direction.

Next, in Step S117, an image rotation operation is performed on the image 202 displayed on the display 200 according to the drawing forming direction 210. That is to say, the image 202 displayed on the display 200 is rotated by taking the drawing forming direction 210 of the stream of drawing 204 as a rotation direction. That is, when the forming direction of the stream of drawing 204 is a clockwise direction, the image 202 displayed on the display 200 is rotated by a predetermined angle in a clockwise direction. The predetermined angle is, for example, an angle of 90 degrees. The manner of rotating the image is, for example, rotating the image 202 by taking the geometric center of the image region 308 enclosed by the minimum external border 306 as a central rotation axis. In another embodiment, the manner of rotating the image is, for example, rotating the image 202 by taking the geometric center of the image 202 as the central rotation axis. In the embodiment shown in FIGS. 2A to 2C, according to the drawing forming direction 210 of the stream of drawing 204 formed on the display 200 by the input tool, i.e., the finger, the image 202 is rotated in a clockwise direction by an angle of 90 degrees by taking the geometric center of the image 202 as the central rotation axis (as shown in FIG. 2C).

Furthermore, when the input of a stream of drawing 204 having a drawing initiation action, a drawing connection action following the drawing initiation action, and the final drawing ending action is directly formed on the display 200 by the user, the information of the initial point, the end point, and the drawing connection points on the stream of drawing is extracted, and the image processing Steps S103-S113 shown in FIG. 1 are performed. When operating the drawing ending action, the image rotation process operation in Step S117 is triggered. That is to say, during the image rotation process operation of the present invention, the user does not have to carry out any confirmation actions of the image operation addition to the stream of drawing inputting, but only has to effectively input the stream of drawing on the display (i.e., the input of the stream of drawing is the non-closed region input). Once the drawing ending action id finished, an image rotation operation is performed corresponding to the forming direction of the input stream of drawing.

In view of above, the present invention directly forms a stream of drawing as an input on a display, and an image rotation process is performed on an image displayed on the display when inputting the stream of drawing, according to the information of the input stream of drawing including whether the stream of drawing accords with the non-closed region input and the pattern forming direction of the stream of drawing. Therefore, the user does not have to carry out any additional input steps to perform a rotation operation of the image on the display after inputting the stream of drawing on the display.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An image processing method for using a stream of drawing as an input on an image displayed by a display, comprising:
   identifying the input by:
      identifying a minimum external border of the stream of drawing according to relative coordinates of the initial point, the end point and the drawing connection points of the stream of drawing on the display;
      equally dividing an image region enclosed by the minimum external border into several sub-regions, wherein the sub-regions further comprise at least one center sub-region at a geometric center of the image region;
      identifying a first sub-region and a second sub-region where the initial point and the end point are located respectively, and a plurality of third sub-regions where a portion of the drawing connection points close to the end point are located;
      identifying the input as the non-closed region input when the second sub-region and third sub-regions are not adjacent to the first sub-region respectively and when the sub-regions where the drawing connection points are distributed do not comprise the center sub-regions; and
   performing an image rotation operation while the input is a non-closed region input.

2. The image processing method as claimed in claim 1, wherein the stream of drawing comprises an initial point, an end point, and a plurality of drawing connection points between the initial point and the end point.

3. The image processing method as claimed in claim 2, wherein before performing the image rotation operation, the method further comprising identifying a drawing forming direction of the stream of drawing from the initial point through the drawing connection points to the end point.

4. The image processing method as claimed in claim 3, wherein the step of performing the image rotation operation comprises rotating the image by taking the drawing forming direction as a rotation direction.

5. The image processing method as claimed in claim 4, wherein the rotation direction comprises a clockwise direction.

6. The image processing method as claimed in claim 1, wherein the minimum external border is of a rectangular shape.

7. The image processing method as claimed in claim 1, wherein the image rotation operation comprises rotating the image around the geometric center of the image region.

8. The image processing method as claimed in claim 1, wherein the stream of drawing comprises a gesture figure directly formed on the display.

9. The image processing method as claimed in claim 1, wherein the input comprises a drawing initiation action, a drawing connection action, and a drawing ending action.

10. The image processing method as claimed in claim 9, wherein the drawing ending action triggers the image rotation operation.

11. The image processing method as claimed in claim 1, wherein the image rotation operation comprises rotating the image by a predetermined angle.

12. The image processing method as claimed in claim 11, wherein the predetermined angle for rotating the image is about 90 degrees.

13. The image processing method as claimed in claim 1, wherein the image rotation operation comprises rotating the image around the geometric center of the image.

14. An image processing method, useful for using a stream of drawing as an input on an image displayed on a display, wherein the input at least comprises a drawing ending action, the image processing method comprising:

identifying a minimum external border of the stream of drawing according to relative coordinates of a initial point an end point and a plurality of drawing connection points between the initial point and the end point of the stream of drawing on the display;

equally dividing an image region enclosed by the minimum external border into several sub-regions, wherein the sub-regions further comprise at least one center sub-region at a geometric center of the image region;

identifying a first sub-region and a second sub-region where the initial point and the end point are located respectively, and a plurality of third sub-regions where a portion of the drawing connection points close to the end point are located;

identifying the input as the non-closed region input when the second sub-region and third sub-regions are not adjacent to the first sub-region respectively and when the sub-regions where the drawing connection points are distributed do not comprise the center sub-regions;

identifying a drawing forming direction of the stream of drawing; and the drawing ending action of the input triggering an image rotation operation to rotate the image along the drawing forming direction which is regarded as a rotation direction.

15. The image processing method as claimed in claim 14, wherein an angle for rotating the image is about 90 degrees.

16. The image processing method as claimed in claim 14, wherein the minimum external border is of a rectangular shape.

17. The image processing method as claimed in claim 14, wherein the image rotation operation comprises rotating the image around the geometric center of the image region.

18. The image processing method as claimed in claim 14, wherein the image rotation operation comprises rotating the image around the geometric center of the image.

19. The image processing method as claimed in claim 14, wherein the stream of drawing comprises a gesture figure directly formed on the display.

20. The image processing method as claimed in claim 14, wherein the image rotation operation comprises rotating the image by a predetermined angle.

21. The image processing method as claimed in claim 20, wherein a predetermined angle for rotating the image is about 90 degrees.

22. The image processing method as claimed in claim 14, wherein the rotation direction comprises a clockwise direction.

* * * * *